US012768100B2

(12) United States Patent
Himstedt et al.

(10) Patent No.: US 12,768,100 B2
(45) Date of Patent: Oct. 20, 2026

(54) CARPET WITH LAYERED NONWOVEN PRIMARY BACKING

(71) Applicant: JOHNS MANVILLE, Denver, CO (US)

(72) Inventors: Heath H Himstedt, Littleton, CO (US); Rui Ferreira, Boulder, CO (US)

(73) Assignee: Johns Manville, Denver, CO (US)

( * ) Notice: Subject to any disclaimer, the term of this patent is extended or adjusted under 35 U.S.C. 154(b) by 273 days.

(21) Appl. No.: 18/599,656

(22) Filed: Mar. 8, 2024

(65) Prior Publication Data

US 2024/0318379 A1 Sep. 26, 2024

Related U.S. Application Data

(60) Provisional application No. 63/454,186, filed on Mar. 23, 2023.

(51) Int. Cl.
*D06N 7/00* (2006.01)
*B32B 5/02* (2006.01)
(Continued)

(52) U.S. Cl.
CPC ........... *D06N 7/0068* (2013.01); *B32B 5/022* (2013.01); *B32B 5/028* (2013.01); *B32B 5/266* (2021.05); *B32B 5/271* (2021.05); *B32B 5/273* (2021.05); *B32B 7/02* (2013.01); *D04H 1/4218* (2013.01); *D04H 1/4291* (2013.01); *D04H 1/43825* (2020.05); *D06N 7/0081* (2013.01);
(Continued)

(58) Field of Classification Search
CPC ............... D06N 7/0068; D06N 7/0081; D06N 2201/0254; D06N 2201/082; D06N 2201/10; D06N 2211/066; D04H 1/4218; D04H 1/43825; D04H 1/4291; B32B 5/266; B32B 5/022; B32B 5/271; B32B 5/273; B32B 5/028; B32B 7/02; B32B 2262/124; B32B 2307/7376; B32B 2255/26; B32B 2262/0261; B32B 2262/0276; B32B 2262/04; B32B 2307/718; B32B 2471/02; B32B 2321/022; B32B 2503/041
See application file for complete search history.

(56) References Cited

U.S. PATENT DOCUMENTS 3,834,978 A 9/1974 Nisenson et al.
3,978,257 A 8/1976 Ring
(Continued)

FOREIGN PATENT DOCUMENTS

EP 2 883 988 A1 6/2015
EP 3 137 294 B1 4/2018
EP 3 218 543 B1 8/2019

*Primary Examiner* — Jeremy R Pierce
(74) *Attorney, Agent, or Firm* — Robert D. Touslee

(57) ABSTRACT

Provided is a carpet comprising a textile top member, which includes carpet yarns and a nonwoven primary backing that is coupled with the carpet yarns so that the primary backing structurally supports the carpet yarns. The nonwoven primary backing has a layered configuration of fibers where the average fiber diameters of the fibers in one layer differs from the average fiber diameter in the layer or layers adjacent thereto. The layers are configured to mechanically reinforce and stabilize the carpet yarns. A secondary backing is coupled with the textile top member via a thermoplastic material. The carpet can be a carpet tile or a carpet rug.

20 Claims, 3 Drawing Sheets

(51) Int. Cl.

| | |
|---|---|
| ***B32B 5/26*** | (2006.01) |
| ***B32B 7/02*** | (2019.01) |
| ***D04H 1/4218*** | (2012.01) |
| ***D04H 1/4291*** | (2012.01) |
| ***D04H 1/4382*** | (2012.01) |

(52) U.S. Cl.

CPC ....... *B32B 2255/02* (2013.01); *B32B 2255/26* (2013.01); *B32B 2262/0253* (2013.01); *B32B 2262/0261* (2013.01); *B32B 2262/0276* (2013.01); *B32B 2262/04* (2013.01); *B32B 2262/124* (2021.05); *B32B 2307/718* (2013.01); *B32B 2307/7376* (2023.05); *B32B 2471/02* (2013.01); *D06N 2201/0254* (2013.01); *D06N 2201/082* (2013.01); *D06N 2201/10* (2013.01); *D06N 2211/066* (2013.01); *D10B 2321/022* (2013.01); *D10B 2503/041* (2013.01)

(56) References Cited

U.S. PATENT DOCUMENTS

| | | | | |
|---|---|---|---|---|
| 4,010,302 | A | 3/1977 | Anderson et al. | |
| 4,522,857 | A | 6/1985 | Higgins | |
| 4,689,256 | A | 8/1987 | Slosberg et al. | |
| 4,871,603 | A | 10/1989 | Malone | |
| 5,198,277 | A | 3/1993 | Hamilton et al. | |
| 5,470,648 | A | 11/1995 | Pearlman et al. | |
| 5,540,968 | A | 7/1996 | Higgins | |
| 5,612,113 | A | 3/1997 | Irwin, Sr. | |
| 5,759,927 | A | 6/1998 | Meeker | |
| 6,045,645 | A | 4/2000 | Groh et al. | |
| 6,060,145 | A | 5/2000 | Smith et al. | |
| 6,114,262 | A | 9/2000 | Groh et al. | |
| 6,207,599 | B1 | 3/2001 | Coolen et al. | |
| 6,280,818 | B1 | 8/2001 | Smith et al. | |
| 6,344,254 | B1 | 2/2002 | Smith et al. | |
| 7,918,313 | B2 | 4/2011 | Gross et al. | |
| 9,644,314 | B2 | 5/2017 | Visscher | |
| 11,084,186 | B2 | 8/2021 | Williams et al. | |
| 11,510,515 | B2 | 11/2022 | Himstedt et al. | |
| 11,618,997 | B2 | 4/2023 | Himstedt et al. | |
| 2003/0175475 | A1 * | 9/2003 | Higgins | B32B 5/06 428/95 |
| 2005/0142325 | A1 | 6/2005 | Veurink et al. | |
| 2005/0287334 | A1 | 12/2005 | Wright et al. | |
| 2007/0254130 | A1 * | 11/2007 | Cheek | B32B 5/22 428/95 |
| 2007/0270064 | A1 | 11/2007 | Aseere | |
| 2011/0244204 | A1 | 10/2011 | Migliavacca et al. | |
| 2011/0256335 | A1 | 10/2011 | Brumbelow et al. | |
| 2012/0244310 | A1 * | 9/2012 | Visscher | B32B 5/022 428/95 |
| 2015/0176164 | A1 | 6/2015 | Lucas | |
| 2017/0037554 | A1 | 2/2017 | Higgins | |
| 2022/0195662 | A1 | 6/2022 | Tyler | |

* cited by examiner

CARPET WITH LAYERED NONWOVEN PRIMARY BACKING

CROSS-REFERENCE TO RELATED APPLICATIONS

This application is a non-provisional application claiming benefit of U.S. provisional Application No. 63/454,186 filed Mar. 23, 2023.

BACKGROUND

Carpet typically includes face fibers, in the form of tufts, primary and secondary backing members and latex or adhesives, or both, to bind the components together. Tufted carpet is widely used today in the United States and abroad. Such carpet is produced by tufting machines which are essentially multi-needled sewing machines. The tufting machines push or, more specifically, sew the face yarns of the carpet (also referred to as pile yarns) through a primary backing, forming loops in the face yarns. The primary backing is often a glass-based woven mat, responsible for holding the carpet tufts in position. The machines also hold the face yarns in place while the needles are withdrawn. The resulting loops formed by the face yarns are then either released to form loop-pile, tufted carpet, or cut to form cut-pile, tufted carpet.

A secondary backing, attached to the backstitched side of the primary backing, i.e., the side opposite the protruding face yarns, is used to hold the tufted face yarn in place and is typically attached to the primary backing by a latex or other binding adhesive applied to the backstitched side of the primary backing.

A primary carpet backing is a critical component of a carpet, for both broadloom and carpet tiles. While face threads are tufted into the primary backing via a needling process, the primary backing must hold these threads in position for pattern definition and carpet stability. However, this must be balanced with the desire for minimal needle penetration resistance.

Regarding primary backing materials, U.S. Pat. Nos. 6,344,254 and 6,060,145 are examples of woven construction. U.S. Pat. No. 11,084,186B2 on the other hand is an example of a polyester spunbond primary backing. A number of patents on carpet and carpet tile construction, such as those listed above, outline coating the tufted primary backing with latex and then adhering that composite to a nonwoven or woven glass mat for dimensional stability, see U.S. Pat. Nos. 5,198,277 and 4,010,302 specifically. U.S. Pat. No. 4,871,603 perhaps best summarizes the generally accepted carpet construction with a cushioned carpet tile where the primary backing is preferably a woven, but could be a nonwoven, and of a synthetic material such as nylon, polyester, or polypropylene, or a fiberglass backing. This is coated with a latex layer.

The industry, however, continues to search for a primary backing that would offer the dual benefit of easier needle penetration/release and good tuft holding/stability. Such is offered here, and provides for a novel carpet enjoying stability and ease of preparation.

SUMMARY

Provided is a carpet comprising a textile top member which includes carpet yarns and a nonwoven primary backing that is coupled with the carpet yarns so that the primary backing structurally supports the carpet yarns. The nonwoven primary backing has a layered configuration of fibers where the average fiber diameters of the fibers in one layer differs from the average fiber diameter in the layer or layers adjacent thereto. The layers are configured to mechanically reinforce and stabilize the carpet yarns. A secondary backing is coupled with the textile top member via a thermoplastic material. The carpet can be a carpet tile or a carpet rug. The fibers in the primary backing of the carpet can comprise polymeric fibers, natural fibers, or fiberglass fibers. In one embodiment, polymeric fibers are preferred.

The primary backing can comprise two layers of fibers, three layers of fibers or more. It is preferred, however, that the primary backing comprises two or three layers.

When the primary backing comprises two layers of fibers, in one embodiment the fibers in the top layer are of a coarser fiber diameter than the fibers in the bottom layer. The coarse fiber diameters are statistically distinct from the average diameter of the fibers in the bottom layer. By statistically distinct is meant that the dtex difference is at least 2 dtex.

When the primary backing comprises three layers, the middle layer of the three layers will generally comprise fibers having a finer average diameter compared to the fibers in the two adjacent layers. In one embodiment, the two layers adjacent to the middle layer comprise the same fibers.

The primary backing will generally have a weight of 10-200 $g/m^2$ and a thickness of 0.05 to 5 mm. Overall, the fibers used in the primary backing will have a diameter between 1 and 15 dtex. The fibers of the primary backing can comprise polyester fibers, polyolefin fibers or a combination of the two. Nylon or cellulose fibers can also be used in one embodiment, as can polypropylene fibers or fiberglass fibers. However, polymeric fibers are preferred.

The carpet comprising the primary backing also comprises a secondary backing. The secondary backing coupled with the textile top member generally has a thickness between 0.25 and 5 cm and has a weight of between 50 and 2500 $g/m^2$. In one embodiment, the secondary backing has a thickness between 0.05 and 10 mm.

In one embodiment, the present carpet comprises a secondary backing couple with the textile top member via a thermoplastic material and which comprises a first portion of polymer fibers that are randomly oriented and entangled together and a second portion of polymer fibers that are randomly oriented and entangled together with the thermoplastic material penetrating into the first portion of polymer fibers to couple the secondary backing with the textile top member.

In another embodiment the secondary backing coupled with the textile top member further comprises a scrim reinforcement that is positioned between and separates the first portion of polymer fibers from the second portion of polymer fibers so that the scrim reinforcement is entirely covered and concealed by the entangled polymer fibers of the first portion and second portion of fibers to prevent the scrim reinforcement from exposure to a user, the scrim reinforcement being configured to mechanically reinforce and stabilize the polymeric material component, and with the scrim reinforcement configured to control penetration of the thermoplastic material so that the thermoplastic material does not penetrate into the second portion of the polymer fibers.

Among other factors, the use of the present nonwoven primary backing with a heterogeneous distribution of fiber diameters would have the dual benefit of easier needle penetration/release due to the coarse fibers, while also providing excellent tuft holding due to the layer of finer fibers. And in a preferred embodiment where polymeric fibers are used, the traditionally used glass woven primary backing can be eliminated, thereby increasing the recyclability of the final product.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Definitions—As Used Herein

Figure 1:
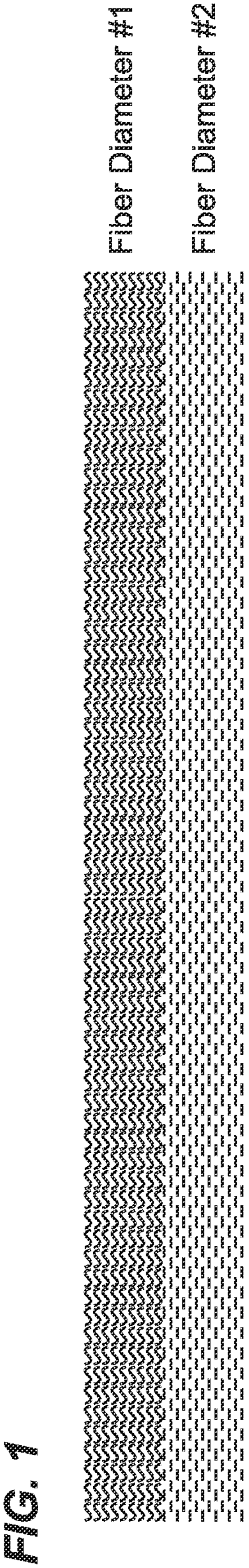
FIG. 1 depicts a primary backing consistent with the present carpet that comprises two layers of fibers with the fibers in each layer having different diameters.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

The term "carpet" shall refer inclusively to all forms of tufted and needled types of carpet, including broadloom, carpet tiles, and carpet rugs.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 10%, within 5%, within 1%, etc. of a stated value. Furthermore, where used, the terms "substantially", "similarly", "about" or "approximately" represent an amount or state close to the stated amount or state that still performs a desired function or achieves a desired result. For example, the term "substantially" "about" or "approximately" may refer to an amount that is within 10% of, within 5% of, or within 1% of, a stated amount or value.

As used herein, the term "nonwoven web", refers to a web that has a structure of individual fibers or threads which are interlaid, but not in any regular, repeating manner. Nonwoven webs have been, in the past, formed by a variety of processes, such as, for example, air laying processes, meltblowing processes, spunbonding processes and carding processes, including bonded carded web processes.

As used herein, the term "meltblown fibers", refers to fibers formed by extruding a molten thermoplastic material through a plurality of fine, usually circular, die capillaries as molten threads or filaments into a high velocity gas (for example, air) stream which attenuates the filaments of molten thermoplastic material to reduce their diameter, which may be to a microfiber diameter. Thereafter, the meltblown fibers are carried by the high velocity gas stream and are deposited on a collecting surface to form a web of randomly dispersed meltblown fibers.

As used herein, the term "spunbonded fibers", refers to small diameter fibers which are formed by extruding a molten thermoplastic material as filaments from a plurality of fine, usually circular, capillaries of a spinneret with the diameter of the extruded filaments then being rapidly reduced by attenuating with high velocity air.

All publications, patents and patent applications cited herein, whether supra or infra, are hereby incorporated by reference in their entirety to the same extent as if each individual publication, patent or patent application was specifically and individually indicated to be incorporated by reference.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

The embodiments described herein are directed to a nonwoven web with heterogeneous fiber diameters. The web is useful in a carpet as a primary backing for broadloom carpet and carpet tile manufacture. Carpets are constructed in multiple layers consisting of carpet yarns, various backing layers, and thermoplastic compounds. The present nonwoven web focuses on the topmost layer of the carpet, known as the primary backing. Carpet face yarns are tufted into the primary backing. This material, which is generally a glass-based woven mat, is responsible for holding the carpet tufts in position (termed tuft bind as defined by ASTM D1335) to ensure proper carpet pattern definition and dimensional stability. The present nonwoven primary backing, when comprised of polymeric fibers, offers two potential benefits compared to a glass-based woven. First, a polymeric mat could be more easily recycled than glass and would cause less worker or installer skin irritation. Secondly, it is believed that a nonwoven whether comprised of polymeric of fiberglass fibers, with adequate tuft bind and dimensional stability could be obtained at a lower basis weight than a woven mat of similar performance. This would reduce the cost and environmental impact of the finished carpet.

The present primary backing is a nonwoven web with distinct regions, each of which contain a majority of fibers of a given fiber diameter. The majority fiber diameter contained within each region varies between the regions. A nonwoven could be produced with at least two regions or layers, where region 1 contains a majority of fibers with diameter A and region 2 contains a majority of fibers with a different diameter B. In a simplest case a nonwoven mat could be produced where a first region or layer is produced, a second region or layer containing a different majority fiber diameter to the first region is then produced above or below the first region, and these two regions are then formed into a single integral nonwoven mat via mechanical entangling (i.e., needling or hydroentangling), thermal compositing, chemical compositing, or mechanical compositing (i.e., pressure). This could be produced via known nonwoven manufacture techniques such as, but not limited to, spunbond, meltblown, or wetlaid techniques. A nonwoven can also be produced with three regions or layers using the same techniques. Additional regions or layers, for example, five layers or regions, can also be used if desired.

The present primary backing allows one to prepare a useful carpet that is structurally sound yet easier to prepare, and possibly to recycle, due to the characteristics of the primary backing. The carpet thus provided is a carpet comprising a textile top member, which includes carpet yarns and the present nonwoven primary backing that is coupled with the carpet yarns so that the primary backing structurally supports the carpet yarns. The nonwoven primary backing has a layered configuration of fibers where the average fiber diameters of the fibers in one layer differs from the average fiber diameter in the layer or layers adjacent thereto. The layers are configured to mechanically reinforce and stabilize the carpet yarns. A secondary backing is coupled with the textile top member via a thermoplastic material. The secondary backing can be any suitable secondary backing as known.

The fibers in the nonwoven primary backing of the carpet can comprise polymeric fibers, natural fibers, or fiberglass fibers. In one embodiment, polymeric fibers are preferred. The polymeric fibers can comprise polyester, polyolefins, or a combination of polyesters and polyolefins. In one embodiment, the fibers comprise polypropylene fibers. The fibers can also comprise nylon or cellulose fibers.

Bicomponent fibers can also be used. The bicomponent fibers can be fibers having a core/sheath structure where the core and sheath are different fibrous materials. The different fibrous materials can be materials of different chemical characteristics or different physical characteristics, e.g., melting point, or both. The bicomponent fibers can also be fibers where two different fibrous materials are merged to make one fiber, e.g., in a side by side relationship.

The primary backing can comprise two layers of fibers, three layers of fibers or more, for example, five layers. It is preferred, however, that the primary backing comprises two or three layers. When the primary backing comprises two layers of fibers, in one embodiment, the fibers in the top layer are of a coarser fiber diameter than the fibers in the bottom layer. The coarse fiber diameters are statistically distinct from the average diameter of the fibers in the bottom layer. By statistically distinct is meant that the dtex difference is at least 2 dtex.

Generally, the coarse fiber diameters are greater than 8 dtex and the finer fiber diameters are less than 5 dtex. In one embodiment, the finer fibers have a fiber diameter of about 2 dtex and the more coarse fibers have a diameter of about 5 dtex or more. Overall, the fibers in the primary backing will have a diameter between 1 and 15 dtex, with the finer fibers having a diameter between 1 and 4 dtex and the coarse fibers having a diameter of 5-15 dtex.

When the primary backing comprises three layers, the middle layer of the three layers will generally comprise fibers having a finer average diameter compared to the fibers in the two adjacent layers. In one embodiment, the two layers adjacent to the middle layer comprise the same fibers. However, it is not a requirement that the middle layer comprise fibers having a finer average diameter than the fibers in the two adjacent layers. The fibers in the middle layer can be of the same average diameter or even coarser than the fibers in either one, or both, of the adjacent layers.

The primary backing will generally have a weight of 10-200 g/m$^2$ and a thickness of between 0.05 and 5 mm. The weight can also be in the range of from 50 and 150 g/m$^2$, or in one embodiment from 75-135 g/m$^2$. The thickness in one embodiment can be in the range of from 0.5-1 mm.

The carpet comprising the primary backing also comprises a secondary backing. The secondary backing coupled with the textile top member generally has a thickness between 0.25 and 5 cm and has a weight of between 50 and 2500 g/m$^2$. In one embodiment, the secondary backing has a thickness between 0.05 and 10 mm, or 1-8 mm in another embodiment. The weight can also be, in one embodiment, in the range of from 100 to 1000 g/m$^2$.

While the secondary backing can be any traditional secondary backing, in one embodiment, the present carpet comprises a secondary backing coupled with the textile top member via a thermoplastic material which secondary backing comprises two layers of polymer fibers. A first portion of polymer fibers that are randomly oriented and entangled together and a second portion of polymer fibers that are randomly oriented and entangled together with the thermoplastic material penetrating into the first portion of polymer fibers to couple the secondary backing with the textile top member.

In another embodiment, the secondary backing coupled with the textile top member further comprises a scrim reinforcement that is positioned between and separates the first portion of polymer fibers from the second portion of polymer fibers. The scrim is positioned so that the scrim reinforcement is entirely covered and concealed by the entangled polymer fibers of the first portion and second portion of fibers to prevent the scrim reinforcement from exposure to a user. The scrim reinforcement is configured to mechanically reinforce and stabilize the polymeric material component and to control penetration of the thermoplastic material so that the thermoplastic material does not penetrate into the second portion of the polymer fibers. It has been found that the combination of the present primary backing with such a secondary backing realizes a most improved carpet in terms of stability and physical characteristics, as well as ease of preparation.

Reference now to the Figures of the Drawing may provide further understanding of the present invention. The drawings are not to be construed, however, as limiting the scope of the invention.

Figure 2:
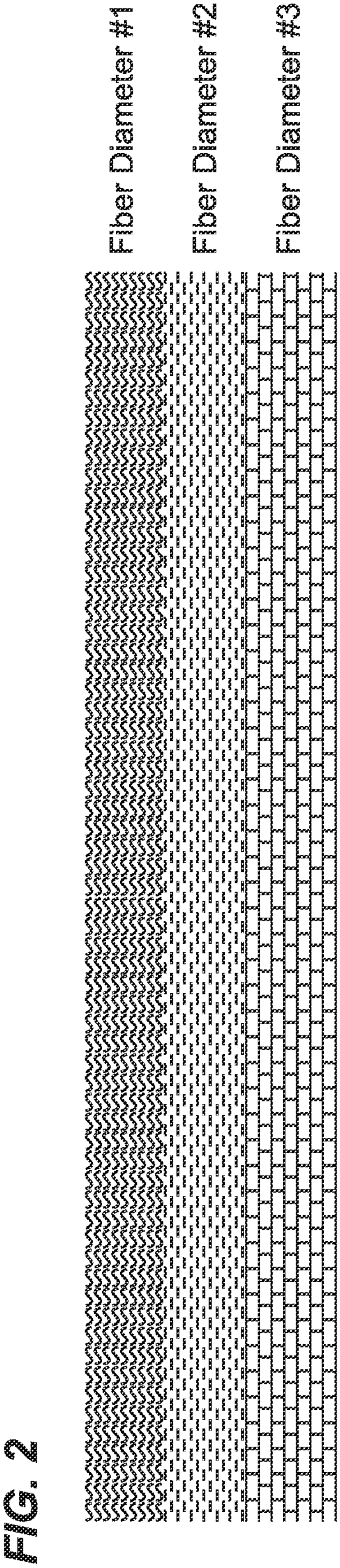
FIG. 2 depicts a primary backing consistent with the present carpet that comprises three layers of fibers where the fibers in adjacent layers having different diameters.

Turning now to FIG. 1, which depicts a two layer primary backing consistent with the present carpet. The polymeric spunbond nonwoven primary carpet backing which is although a single nonwoven is composed of layers/striations of polymeric fibers with different average fiber diameters. In the two most simple case the nonwoven consists of two layers of differing fiber diameters. The layers labeled "Fiber Diameter #1" and "Fiber Diameter #2" must be different fiber diameters. However, turning to FIG. 2, in the case with three layers, "Fiber Diameter #3" may or may not be the same diameter as "Fiber Diameter #1". The magnitude of differences between the fiber diameter in these layers can be tuned to achieve the desired tufting performance.

Figure 3:
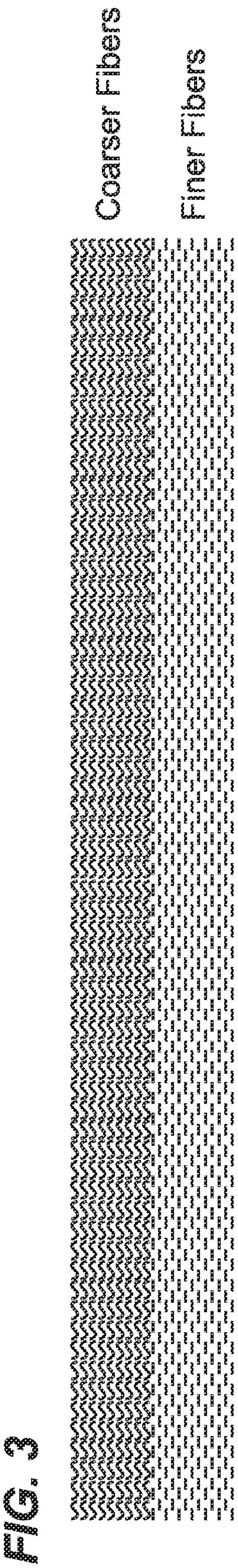
FIG. 3 depicts a primary backing consistent with the present carpet that comprises two layers of fibers with the more coarse fibers being the top layer oriented towards the outside of the nonwoven.

Turning now to FIG. 3, it is anticipated that the heterogenous spunbond nonwoven should be constructed such that the coarsest fibers are orientated towards the outside of the nonwoven. In this orientation during tufting the needles will first encounter the coarse fibers—whether needled only from above or needled from above and below. The needles will easily slide through the coarse fiber layer, while the carpet tuft yarns will be held in place by the finer fibers once the needles are removed. In this particular embodiment the two layers of coarser fibers are the same fiber diameter; however, these could contain different fiber diameters.

Figure 4:
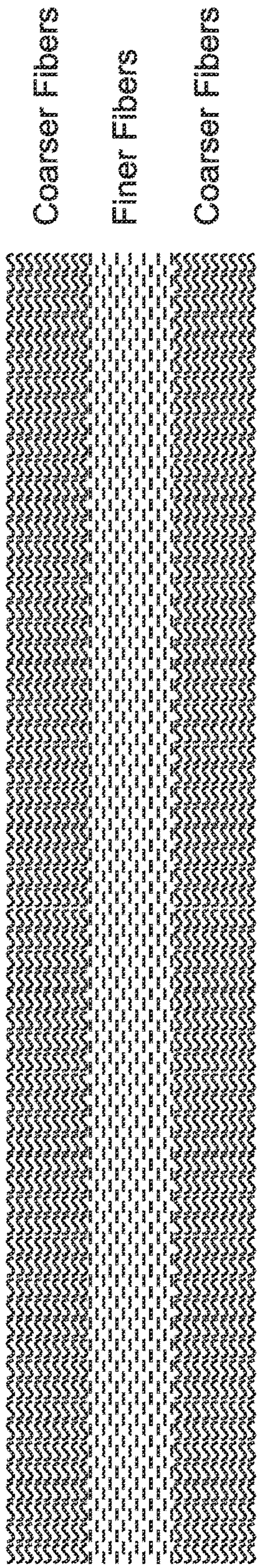
FIG. 4 depicts a primary backing consistent with the present carpet that comprises three layers of fibers with the coarsest fibers on the top and bottom.

In FIG. 4, a primary backing useful in the present carpet is depicted having three layers. The coarser, larger diameter, fibers are set on the outside of the middle layer, which contains finer, smaller diameter fibers.

In FIGS. 3 and 4, a polymeric spunbond nonwoven is produced such that it contains either two or three layers. These layers are produced by a single spunbond beam producing fibers of certain diameter. A second layer, would be produced by a subsequent spunbond beam. The layers would be joined together, preferably by mechanical needling, to form a single integral nonwoven. This could be extended to three layers, where it is anticipated that the preferred embodiment is the outer two layers being coarser fibers, which are essentially the same fiber diameter, with an inner layer of finer fibers. It is anticipated that the coarser fibers will allow easier needle penetration and retraction during tufting, while the finer inner fiber layer will contribute to improved tuft bind. Numerous adaptations to this could be made to improve tufting performance and carpet dimensional stability. For example, one could vary the magnitude of differences between the fiber diameters in the coarse and fine layer(s). A binder or other liquid additive could be added to assist in tuft bind. Mono or bi-component polymeric spunbond fibers could be used as well. It is anticipated that in one embodiment there will be a three-layer bi-component polyester spunbond mat of weight 10-200 $g/m^2$, thickness between 0.05 and 5 mm, fiber diameters between 1 and 15 dtex. It is anticipated the coarse fiber diameters would be greater than 8 dtex and the fine fibers less than 5 dtex.

Figure 5:
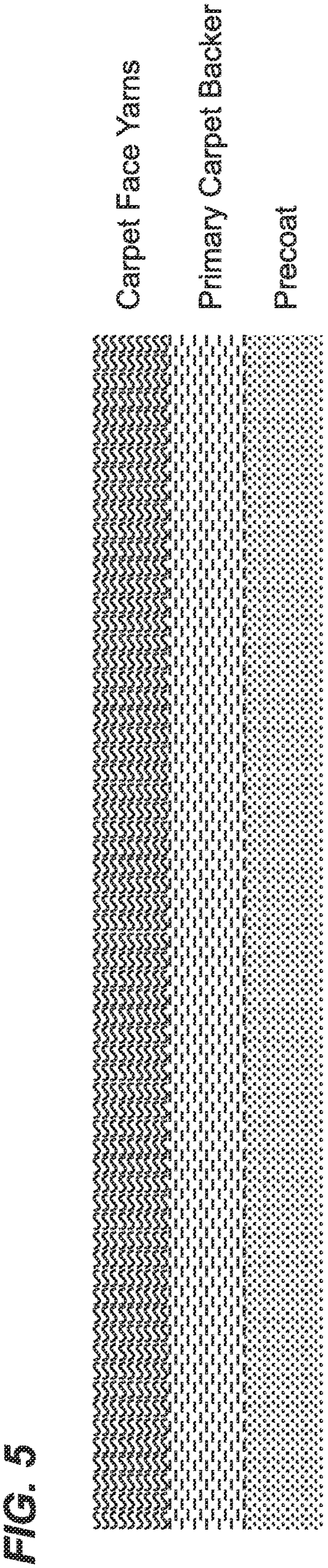
FIG. 5 depicts the layers of a textile top member consistent with the present carpet.

In FIG. 5, the overall carpet or carpet tile construction is not changed. The carpet face yarns are still tufted into the primary carpet backer. This combination is then set in place via the application of a precoat layer before continuing towards final carpet manufacture.

Figure 6:
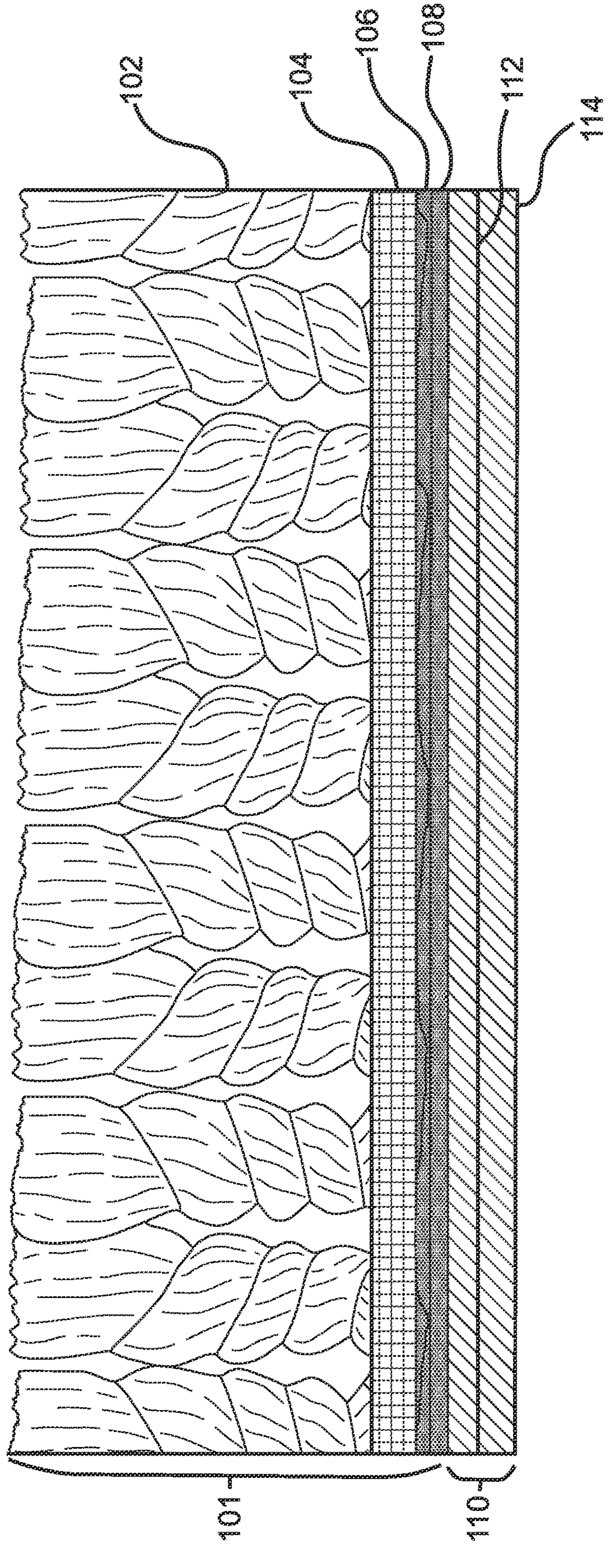
FIG. 6 depicts a complete carpet consistent with the present invention.

In FIG. 6, a complete present carpet is shown, with a textile top member including a nonwoven primary backing. A secondary backing is coupled with the textile top member. In the FIG., the carpet includes a textile top member 101 that is positioned atop a secondary backing 110.

The textile top member includes carpet yarns 102 that are attached to a primary backing 104 as described above. The carpet yarns 102 may be formed from any fabric or other textile material to fit the needs or aesthetics of a particular application, and may specifically include tufted carpet yarns, pile fabric yarns, polyester fibers, nylon fibers, polyolefin fibers, and the like. The carpet yarns 102, such as a pile fabric layer or other fabric layer, serves as an exposed top surface of the carpet tile. The carpet yarns 102 are typically hooked through the primary backing 104 and secured or coupled to the back of the primary backing 104. Coupling the carpet yarns 102 to the primary backing 104 typically involves using various adhesives, such as hot melt materials. The primary backing 104 is part of and structurally supports and reinforces the textile top member 101. A pre-coat 106 is typically positioned on the backing 104 to lock the carpet yarns 102 in place. The pre-coat may be a latex based material or any other suitable material. In some instances, the pre-coat may be a hot melt adhesive that may be designed to permit lamination between the textile top member 101 and secondary backing 110. The textile top member 101 may include additional materials, such as flame retardants and the like, depending on the end use of the carpet.

The secondary backing 110 is attached to the textile top member 101 via a thermoplastic material 108, such as a thermoplastic elastomer and/or a plastisol material.

Exemplary thermoplastic materials 108 that may be used to couple the secondary backing 110 with the textile top member 101 include polymers or copolymers of latex, vinyl chlorides, polyolefins, polyurethanes, acrylates, acrylics, or styrenes. The thermoplastic material 108 typically adheres to the precoat layer 106 and penetrates into the mat 110. The amount or degree of penetration of the thermoplastic material 108 into the mat 110, may be controlled as described below.

The secondary backing 110 can be a multi-function unitary or consolidated material that provides the above described cushioning and structural features. The secondary backing material is a required layer that provides dimensional stability to the carpet. The secondary backing is coated with a thermoplastic coating so that the glass fibers are not exposed to a user, which may cause irritation and/or itch. The thermoplastic coating is typically applied as a coating to the top and bottom of the secondary backing to ensure that the thermoplastic material fully surrounds and encapsulate any glass fibers.

In one embodiment, structural strength is provided by a scrim reinforcement 112 that is disposed within a polymeric material component 114 so that the scrim reinforcement 112 is entirely covered and concealed by the intermeshed or entangled polymer fibers. The positioning of the scrim reinforcement 112 within the polymeric material component 114 prevents the scrim reinforcement 112 from being exposed to the surrounding environment, and in particular to a user that may be handling or installing the carpet. The scrim reinforcement 112 is a fiber mat that includes fibers or rovings that are typically oriented perpendicularly. It has been found that the combination of the present primary backing with such a secondary backing provides an improved carpet in terms of stability and physical characteristics, as well as ease of preparation.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A carpet comprising:

a textile top member including carpet yarns and a nonwoven primary backing that is coupled with the carpet yarns so that the primary backing structurally supports the carpet yarns;

the nonwoven primary backing having a layered configuration of layers of fibers where the average fiber diameters of the fibers in one layer differs from the average fiber diameter in the layer or layers adjacent thereto, with the layers configured to mechanically reinforce and stabilize the carpet yarns; and a secondary backing coupled with the textile top member via a thermoplastic material;

wherein the primary backing comprises at least three layers of fibers; and wherein the two outermost layers of the primary backing each comprise fibers having an average diameter greater than an average fiber diameter of the fibers of the one or more middle layers.

2. The carpet of claim 1, wherein the fibers comprise polymeric fibers.

3. The carpet of claim 1, wherein the fibers comprise fiberglass fibers.

4. The carpet of claim 1, wherein the primary backing has three layers of fibers.

5. The carpet of claim 4, wherein the two layers adjacent to the middle layer comprise the same fibers.

6. The carpet of claim 1, wherein the primary backing comprises five layers of polymeric fibers.

7. The carpet of claim 1, wherein the primary backing has a weight of 10-200 $g/m^2$ and a thickness of 0.05 to 5 mm.

8. The carpet of claim 7, wherein the fiber diameters are between 1 and 15 dtex.

9. The carpet of claim 1, wherein the fibers of the primary backing comprises polyester, polyolefin, or a combination of polyester and polyolefin fibers.

10. The carpet of claim 1, wherein the fibers of the primary backing comprise bicomponent fibers.

11. The carpet of claim 1, wherein the fibers of the primary backing comprise nylon or cellulose fibers.

12. The carpet of claim 1, wherein the fibers of the primary backing comprise polypropylene fibers.

13. The carpet of claim 1, wherein the fibers of the primary backing comprise fiberglass fibers.

14. The carpet of claim 1, wherein the secondary backing coupled with the textile top member has a thickness between 0.25 and 5 cm.

15. The carpet of claim 1, wherein the secondary backing coupled with the textile top member has a weight of between 50 and 2500 $g/m^2$.

16. The carpet of claim 12, wherein the secondary backing has a thickness between 0.05 and 10 millimeters.

17. The carpet of claim 1, wherein the secondary backing coupled with the textile top member via a thermoplastic material comprises:

a first portion of polymer fibers that are randomly oriented and entangled together;

a second portion of polymer fibers that are randomly oriented and entangled together; and wherein the thermoplastic material penetrates into the first portion of polymer fibers to couple the secondary backing with the textile top member.

18. The carpet of claim 17, wherein the secondary backing coupled with the textile top member further comprises a scrim reinforcement that is positioned between and separates the first portion of polymer fibers from the second portion of polymer fibers so that the scrim reinforcement is entirely covered and concealed by the entangled polymer fibers of the first portion and second portion of fibers to prevent the scrim reinforcement from exposure to a user, the scrim reinforcement being configured to mechanically reinforce and stabilize the polymeric material component; and wherein the scrim reinforcement is configured to control penetration of the thermoplastic material so that the thermoplastic material does not penetrate into the second portion of polymer fibers.

19. The carpet of claim 1, wherein the carpet is a carpet tile.

20. The carpet of claim 1, wherein the carpet is a carpet rug.

* * * * *